(12) United States Patent
Sosnowski

(10) Patent No.: US 7,900,623 B2
(45) Date of Patent: Mar. 8, 2011

(54) PORTABLE FREESTANDING STOVE

(76) Inventor: Wlodzimierz Sosnowski, Ciechanov (PL)

( * ) Notice: Subject to any disclaimer, the term of this patent is extended or adjusted under 35 U.S.C. 154(b) by 710 days.

(21) Appl. No.: 11/994,304

(22) PCT Filed: Jun. 26, 2006

(86) PCT No.: PCT/PL2006/000043
§ 371 (c)(1),
(2), (4) Date: Dec. 28, 2007

(87) PCT Pub. No.: WO2007/001196
PCT Pub. Date: Jan. 4, 2007

(65) Prior Publication Data
US 2008/0202501 A1 Aug. 28, 2008

(30) Foreign Application Priority Data
Jun. 29, 2005 (PL) .................................. 375965

(51) Int. Cl.
*F24C 1/16* (2006.01)
(52) U.S. Cl. .......... 126/9 R; 126/2; 126/25 R; 126/15 R
(58) Field of Classification Search ................. 126/9 R, 126/15 R, 25 R, 26, 2
See application file for complete search history.

(56) References Cited

U.S. PATENT DOCUMENTS

| 2,573,988 | A | 11/1951 | Saltzberg |
| 5,086,752 | A * | 2/1992 | Hait .................. 126/9 R |
| 6,868,849 | B1 | 3/2005 | Endress |
| 2002/0185122 | A1 | 12/2002 | Bossler |
| 2003/0094169 | A1 * | 5/2003 | Alden .............. 126/25 R |
| 2006/0225724 | A1 * | 10/2006 | Turner ............. 126/9 R |

FOREIGN PATENT DOCUMENTS

| DE | 200 22 220 U1 | 5/2001 |
| FR | 2 775 885 A1 | 9/1999 |

OTHER PUBLICATIONS

International Search Report of PCT/PL2006/000043, date of mailing Nov. 21, 2006.

* cited by examiner

*Primary Examiner* — Alfred Basichas
(74) *Attorney, Agent, or Firm* — Westerman, Hattori, Daniels & Adrian, LLP

(57) ABSTRACT

A portable freestanding stove designed to combust organic material pieces, having open combustion chamber (1) surrounded with sidewall (2) composed of one inverted truncated upper sheet metal cone (6) of combustion chamber (1) and surrounding thereof circumferential sheet metal ring (7) of combustion chamber (1). Positioned under upper cone (6) is second inverted truncated lower sheet metal cone (8) of air draft. Both truncated cones (6, 8) are rigidly positioned, one relative to the other, with axial gap (h) determined by means of circumferential sheet metal ring (7), rigidly connected to them and positioned at external circumference thereof. The lower part of upper cone (6) connects to grate (3), under which sheet metal ash pan (4) is positioned. Circumferential sheet metal ring (7) of stove rests on supporting structure (5).

15 Claims, 1 Drawing Sheet

PORTABLE FREESTANDING STOVE

Figure 1:
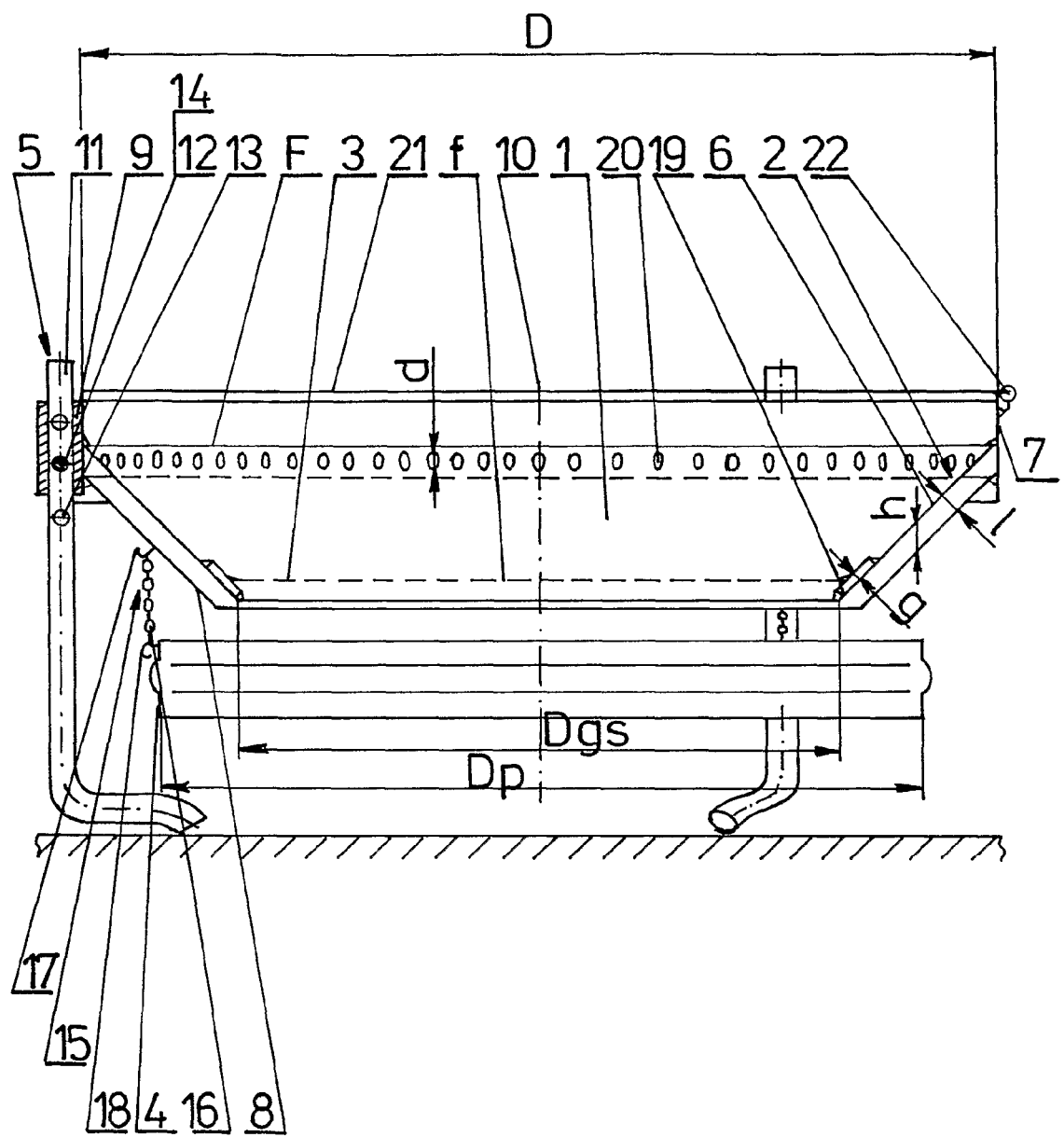

The invention refers to a portable freestanding stove designed to combust organic material pieces, especially wood pieces, the stove being mainly intended to prepare food products in outdoor open air.

Stoves of various designs to prepare food products in outdoor open air have been known in the prior art for many years.

It is an object of the invention to provide a specific portable free standing stove fired with wood pieces so as to roast or prepare food products in outdoor open air, with increased efficiency of after-burning and decreased smoke exhaust, with effective ash collection of resulting good burnout of the fuel material.

It is also an object of the invention to prevent the scatter of any under burnt pieces of flammable fuel material as well as to prevent the mulch to set on fire because of accidental control failure.

According to the invention, the stove sidewall is composed of one upper inverted truncated cone of combustion chamber, the cone being made of sheet metal, and a circumferential sheet metal ring that surrounds the combustion chamber. Second lower inverted truncated cone made of sheet metal to provide air draft is located below the upper cone. Both truncated cones are rigidly positioned, one relative to the other, with axial gap in between, and fixed by means of circumferential sheet metal ring rigidly connected to them, the ring being positioned at the external circumference thereof. Lower part of the upper cone connects to a grate, and under the grate a sheet metal ash pan is present. Circumferential ring of the stove rests on a supporting structure. The circumferential ring has a cylindrical shape and is coaxial with the upper inverted truncated cone of combustion chamber and the lower inverted truncated cone of air draft. Sleeves with their axes parallel to the stove axis fixed to external circumference of the circumferential sheet metal ring are present. The stove supporting structure preferably has three vertical pillars positioned, the pillars being within sleeves and the sleeves being uniformly arranged at the circumferential sheet metal ring. The ash pan suspends on three flexible connectors, at least, suspension height thereof being adjustable. Sleeves and pillars of the supporting structure have ports with cotters therein. The ash pan suspends on chains, the chain links being fixed to hooks of the lower inverted truncated cone of air draft and the ash pan, respectively. Between the lower part of combustion chamber cone and the grate, at least three struts with thickness equal to 0.01-0.1 diameter of the circumferential sheet metal ring, which surrounds the combustion chamber, are positioned. At circumference of the upper part of combustion chamber cone, there are ports to additionally supply air, the port diameter being 0.01-0.1 internal diameter of circumferential sheet metal ring of the combustion chamber. Ratio of port area total of the grate to cross section area of circumferential sheet metal ring of the combustion chamber is from 0.1 to 0.4. Ratio of the smaller diameter of truncated cone of combustion chamber to diameter of the circumferential sheet metal ring of combustion chamber is from 0.5 to 0.8. A grid is positioned on the upper edge of the circumferential ring. Ratio of the internal ash pan diameter to the smaller diameter of the upper truncated cone is 1.16 or more. In the pillars of supporting structure, there are several ports spaced lengthwise. Ratio of distances between the truncated cone internal walls of combustion chamber and the draft ensuring truncated cone to diameter of the circumferential sheet metal ring of the combustion chamber is from 0.02 to 0.09. The grid deflects relative to the horizontal plane of combustion chamber.

The stove according to the invention provides for increased effectiveness of fuel material after-burning, smoke decrease and advantageous ash collection, also prevents scatter of not burned out pieces of flammable material, ensures increased material combustion and efficiency of energy use, promotes the environment protection.

The stove is easy to carry when taken apart, and while being assembled, it is also easy to match any vehicle transport means. Height adjustment option of the roasting spit on pillars, and also that of ash pan provide for convenient use of the stove.

The features and advantages of the invention will become apparent from the detailed description presented in conjunction with the drawing wherein the portable freestanding stove according to the invention is presented as an axial cross section of a stove exemplary embodiment.

The stove according to this invention has open combustion chamber 1 surrounded by sidewall 2 and grate 3 including ash pan 4, and has supporting structure 5. Sidewall 2 includes upper inverted truncated sheet metal cone 6 of combustion chamber 1 and surrounding thereof circumferential vertical sheet metal ring 7. Second cone 8, i.e. lower inverted truncated sheet metal cone for stove air draft, is under upper cone 6. Cones 6, 8 are rigidly fixed, one relative to the other, with axial gap h in between determined by means of circumferential ring 7, also rigidly connected to cones 6, 8, while ring 7 is at external circumference of cones 6, 8. Grate 3 connects to the lower part of upper cone 6, sheet metal ash pan 4 being under it. Circumferential vertical sheet metal ring 7 rests on supporting structure 5. Circumferential vertical sheet metal ring 7 has a cylindrical shape and is coaxial with upper inverted truncated sheet metal cone 6 of combustion chamber 1 and lower inverted truncated sheet metal cone 8 of stove air draft. Sleeves 9 having their axes parallel to axis 10 of the stove connect to external circumference of circumferential ring 7. Supporting structure 5 of the stove has preferably three vertical pillars 11 positioned within sleeves 9 uniformly arranged at circumferential ring 7. Ash pan 4 suspends on three flexible connectors, at least, with adjustable suspension heights. Ports 12, 13 with cotters 14 inserted therein are in sleeves 9 and pillars 11 of supporting structure 5. Ash pan 4 suspends on chains 15. Chain links 16 are fixed to hooks 17, 18 of lower inverted truncated sheet metal cone 8 of stove draft and ash pan 4, respectively. Between the lower part of cone 6 of combustion chamber 1 and grate 3, at least three struts 19 are present, the thickness g thereof complying with condition $0.01D \leq g \leq 0.1D$, where D is internal diameter of circumferential ring 7 of combustion chamber 1 and g is thickness of strut 19. At circumference of the upper part of cone 6 of combustion chamber 1 there are additional air supplying inlet ports 20 so as to facilitate after-burning of the flammable material, diameter d thereof complying with condition $0.01D \leq g \leq 0.1D$, where D is internal diameter of circumferential ring 7 of combustion chamber 1 and d is diameter of additional air supplying inlet port 20. Ratio of port area total f of grate 3 to cross section area F of circumferential ring 7 of combustion chamber 1 shall comply with condition $$0.1 \leq \frac{f}{F} \leq 0.4.$$

Ratio of smaller diameter $D_{gs}$ of upper cone 6 of combustion chamber 1 to diameter D of circumferential ring 7 of the stove shall comply with condition $$0.5 \leq \frac{D_{gs}}{D} \leq 0.8.$$

Grid 21 rests on the upper edge of circumferential ring 7. Ratio of internal diameter $D_p$ of ash pan 4 to the smaller diameter $D_{gs}$ of truncated upper cone 6 shall comply with condition $$\frac{D_p}{D_{gs}} \geq 1.16.$$

Several ports 13, longitudinally spaced, are in pillars 11 of supporting structure 5. Ratio of distance I between internal walls of truncated upper cone 6 of combustion chamber 1 and truncated lower cone 8 of the stove draft to diameter D of circumferential ring 7 of combustion chamber 1 shall comply with condition $$0.02 \leq \frac{I}{D} \leq 0.09.$$

Grid 21 is deflectable relative to horizontal axis 22. Air for the combustion process of flammable material on the grate 3 comes through ports f of grate 3. Combustion gas is additionally subjected to after-burning downward by means of air supplied to combustion chamber 1 through additional air supplying ports 20. The air inlet height difference, from air inlet under the bottom of cones 6, 8 of combustion chamber 1 and the air draft inlet, also the inlet of additional air supplying ports 20, provides a strong air flow rate and high rate of additional after-burning of combustion gas, the gas rising upwards, which increases temperature of the stove and decreases exhaust smoke thereof. By means of cotters 14 and many ports 13 in pillars 11 and sleeves 9, the required height of combustion chamber 1 can easily be adjusted. By rotating pillars 11 through 180° a compact spacing thereof can be obtained, which is suitable in case of tight surroundings, or also alternatively it can be expanded so as to provide a better stove stability. Due to chains 15 and hooks 17, 18 to position ash pan 4, height adjustment thereof is possible. The combustion chamber 1 surrounding additional wall and use of lower cone 8 decrease outside heat radiation losses of the stove and provide for better safety of use as well as improve the stove efficiency.

The invention claimed is:

1. A portable freestanding stove intended to combust organic material pieces, composed of open combustion chamber including upper inverted truncated sheet metal cone, at a certain distance below which lower second inverted truncated sheet metal cone is positioned, whereas at lower part of upper cone a fire grate is fitted, and below which ash pan is placed, the stove resting on supporting structure, characterized in that upper cone of combustion chamber and lower cone of air draft rigidly connect to each other by means of circumferential sheet metal ring to which upper edge of upper cone of combustion chamber and away below it at axial spacing (h) also upper edge of lower cone are fixed, the circumference of upper edge of upper cone having additional air supplying ports, whereas circumferential sheet metal ring rests on supporting structure and fire grate rigidly connects to lower part of upper cone by means of struts that define a gap between sidewall of combustion chamber and external edge of fire grate.

2. The stove according to claim 1, characterized in that circumferential sheet metal ring is cylindrical and coaxial with inverted truncated upper sheet metal cone of combustion chamber and inverted truncated lower sheet metal cone of air draft.

3. The stove according to claim 1, characterized in that external circumference of circumferential ring has sleeves fixed to it and axes thereof are parallel to axis.

4. The stove according to claim 3, characterized in that supporting structure is composed of three vertical pillars positioned inside sleeves fixed to circumferential ring at equal spacings.

5. The stove according to claim 1, characterized in that supporting structure is composed of three vertical pillars positioned inside sleeves fixed to circumferential ring at equal spacings.

6. The stove according to claim 5, characterized in that sleeves and pillars of supporting structure are provided with ports, which have cotters.

7. The stove according to claim 1, characterized in that ash pan is suspended at least on three flexible connectors provided with length adjustment.

8. The stove according to claim 1, characterized in that at least three struts of thickness complying with condition $(0.01D \leq g \leq 0.1D)$, where (D) is internal diameter of circumferential ring of combustion chamber, are fixed to sidewall.

9. The stove according to claim 1, characterized in that additional air supplying ports have diameter (d) which complies with condition $(0.01D \leq d \leq 0.1D)$, where (D) is internal diameter of circumferential ring of combustion chamber.

10. The stove according to claim 1, characterized in that ratio of area total pf ports (f) of fire grate relative to cross section area (F) of circumferential ring of combustion chamber shall comply with condition $$\left(0.1 \leq \frac{f}{F} \leq 0.4\right).$$

11. The stove according to claim 1, characterized in that ratio of smaller diameter $(D_{gs})$ of truncated upper cone of combustion chamber relative to diameter (D) of circumferential ring shall comply with condition $$\left(0.5 \leq \frac{D_{gs}}{D} \leq 0.8\right).$$

12. The stove according to claim 1, characterized in that upper edge of the circumferential ring has grid positioned on it.

13. The stove according to claim 12, characterized in that grid is deflectable relative to horizontal axis.

14. The stove according to claim 1, characterized in that ratio of internal diameter $(D_p)$ of ash pan to smaller diameter $(D_{gs})$ of truncated upper cone of combustion chamber shall comply with condition $$\left(\frac{D_p}{D_{gs}} \geq 1.16\right).$$

15. The stove according to claim 1, characterized in that ratio of distances (I) between parallel walls of upper truncated cone of combustion chamber and lower truncated cone of air draft relative to diameter (D) of circumferential ring of combustion chamber shall comply with condition $$\left(0.02 \leq \frac{I}{D} \leq 0.09\right).$$

* * * * *